July 19, 1966   A. N. CHIRICO   3,261,670
CONISPHERICAL VESSEL FOR CRYSTALLIZATION
Filed April 21, 1965   4 Sheets-Sheet 1
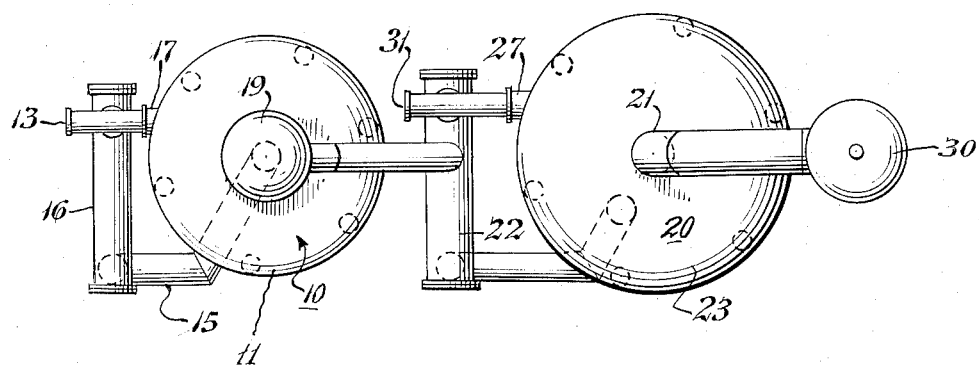
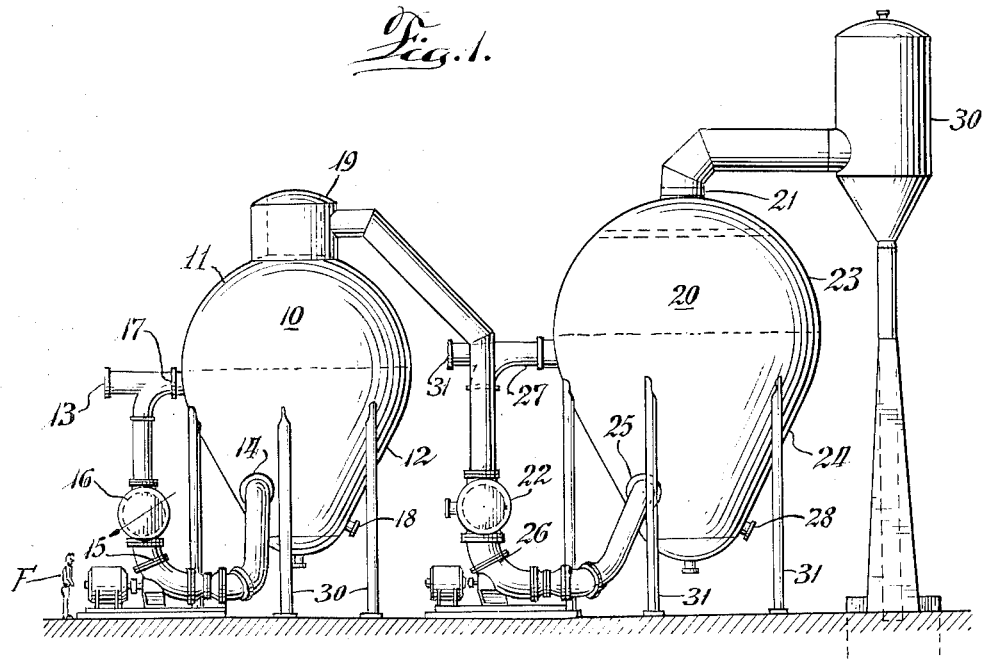
Inventor:
Anthony N. Chirico
By Merriam, Smith & Marshall
Attorneys.

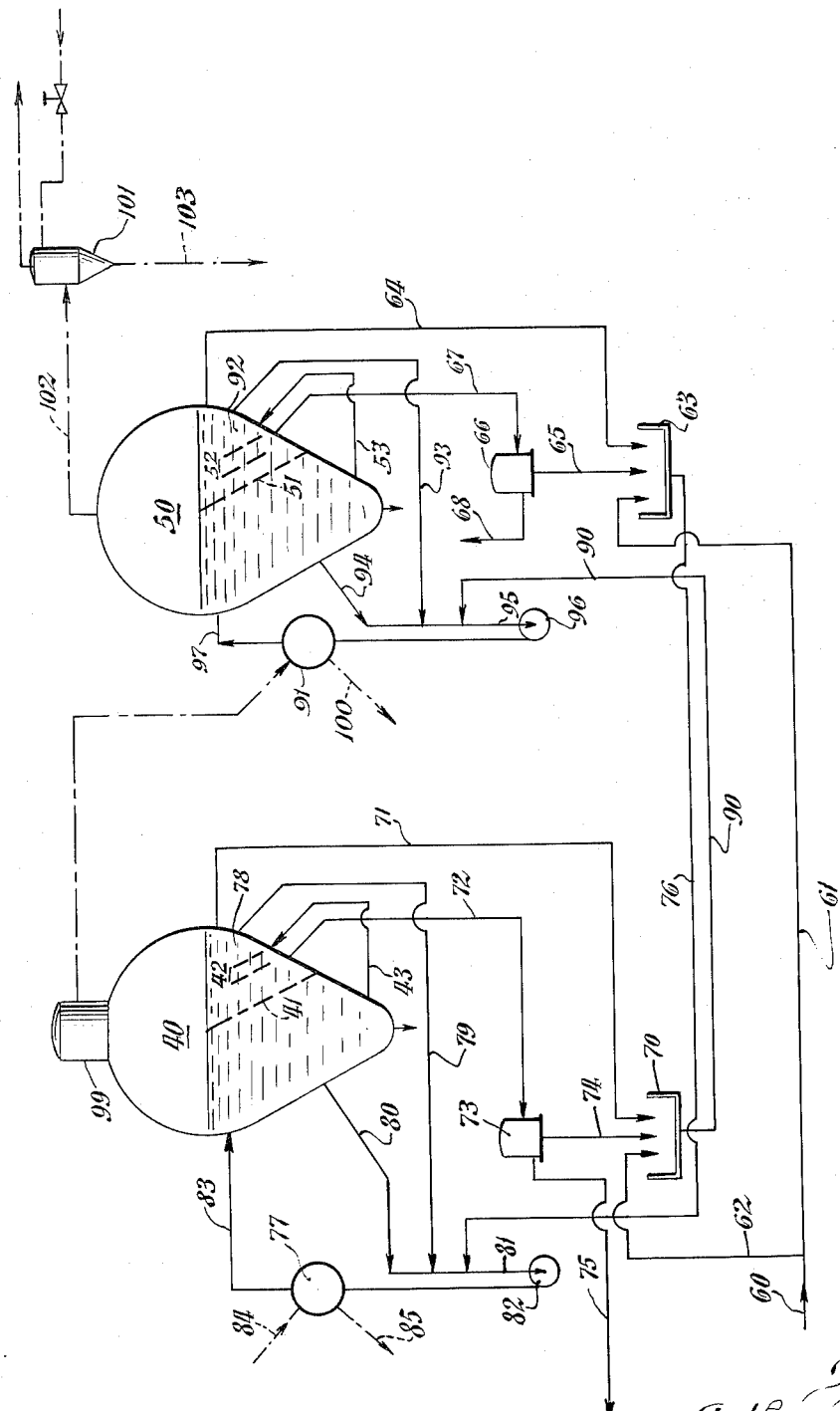

July 19, 1966  A. N. CHIRICO  3,261,670
CONISPHERICAL VESSEL FOR CRYSTALLIZATION
Filed April 21, 1965  4 Sheets-Sheet 3
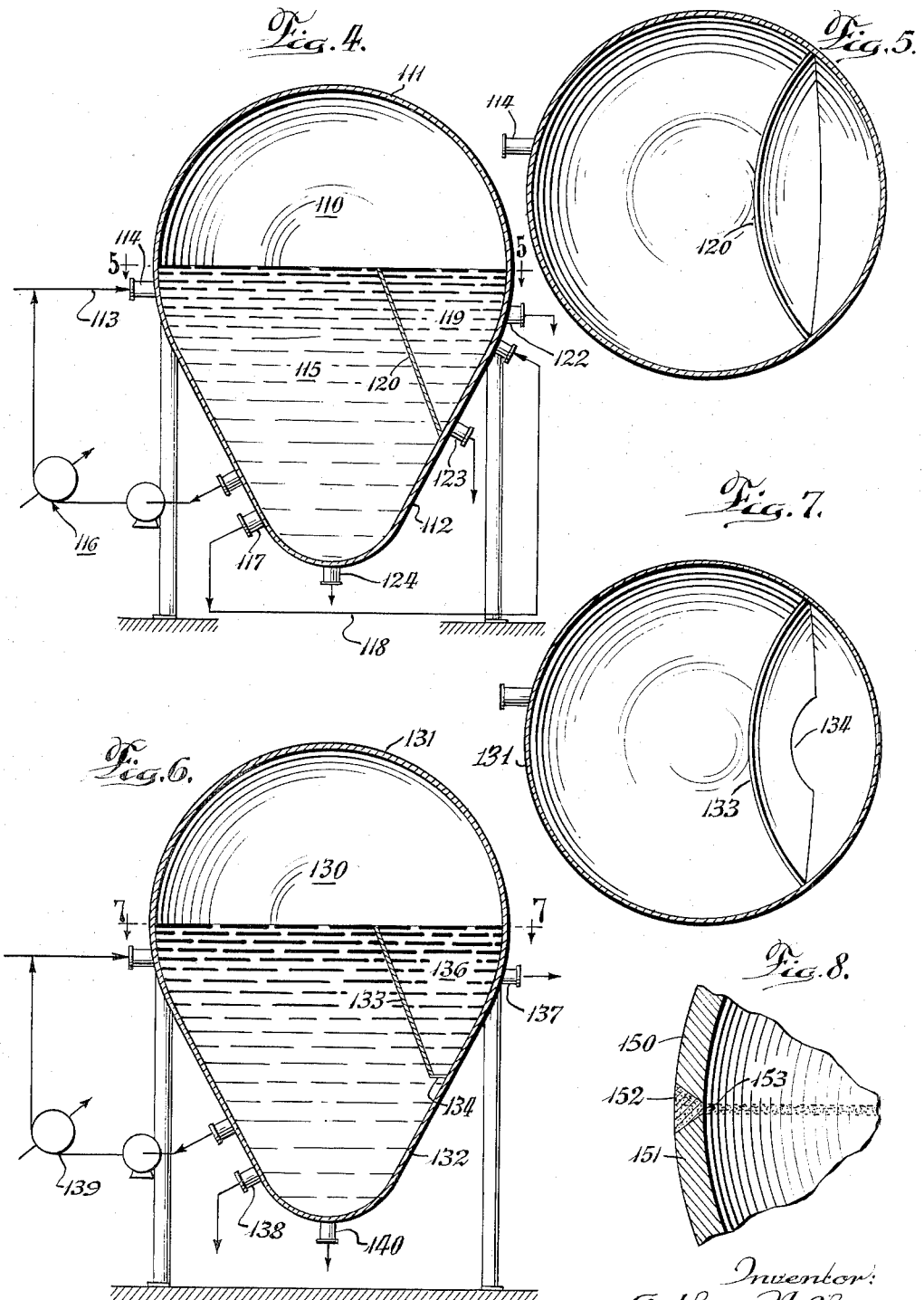
Inventor:
Anthony N. Chirico
By Merriam, Smith & Marshall
Attorneys July 19, 1966 A. N. CHIRICO 3,261,670
CONISPHERICAL VESSEL FOR CRYSTALLIZATION
Filed April 21, 1965 4 Sheets-Sheet 4
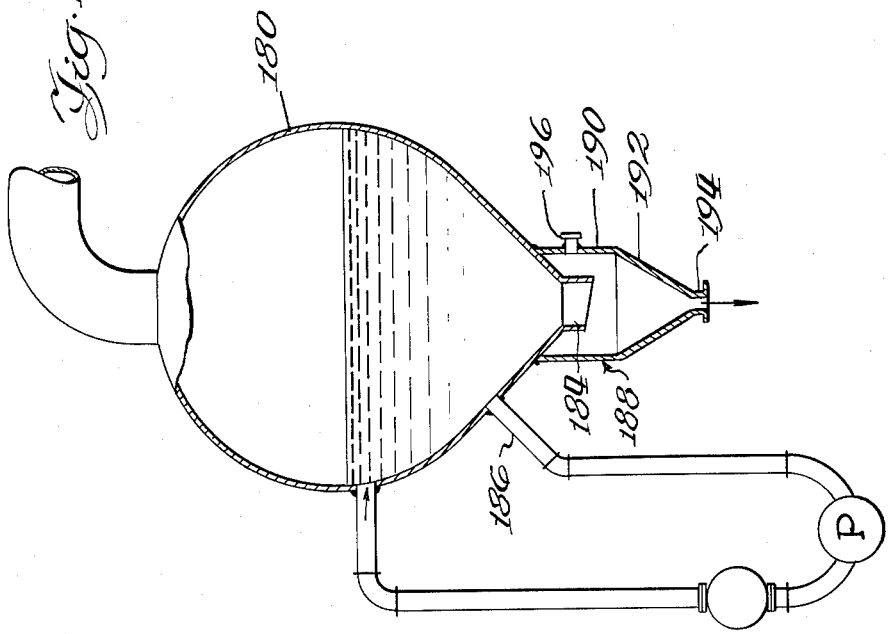
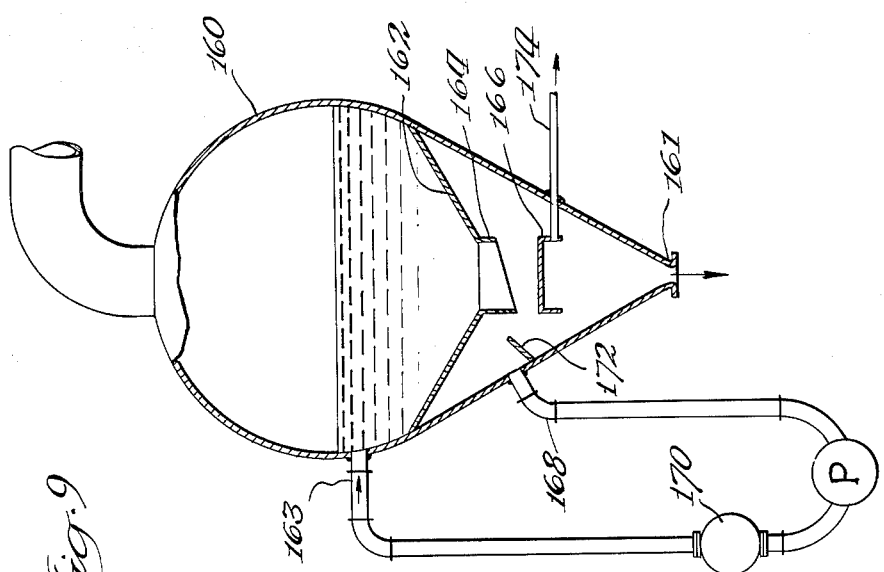
Inventor
Anthony N. Chirico
By Merriam, Smith, & Marshall
Attorneys United States Patent Office 3,261,670
Patented July 19, 1966

3,261,670
CONISPHERICAL VESSEL FOR CRYSTALLIZATION
Anthony N. Chirico, Naperville, Ill., assignor to Chicago Bridge & Iron Company, Oak Brook, Ill., a corporation of Illinois
Filed Apr. 21, 1965, Ser. No. 452,447
11 Claims. (Cl. 23—273)

This application is a continuation-in-part of application Serial No. 186,733 filed April 11, 1962, now abandoned.

This invention relates to chemical process equipment. It is more specifically directed to large capacity crystallizers having a configuration which provides a maximum ratio of vapor release area to volume.

The purification of various chemicals in the crystallization is an important unit process in the chemical process industry. Crystallization offers a practical and economical procedure for obtaining concentrated chemical materials in a purified form and in a condition for efficient material handling for packaging and storing.

In crystallization processes, in order to induce crystallization, the solute fed to the crystallizer is maintained in a supersaturated condition. The crystallization equipment which is employed provides a means for producing and maintaining the necessary supersaturation. Various types of crystallization equipment are employed in the chemical process industry and are classified depending upon the means used to develop supersaturation and to control yield per pass. One of the more important types of crystallizers from an operational and economical standpoint is the one wherein supersaturation is produced by evaporation. In the operation of this type of crystallizer, a liquid feed is introduced into the crystallizer which is normally unsaturated. The feed is introduced through a feed inlet which is located adjacent the normal liquid level in order that the solution can be fed into the crystallizer in such a way that it reaches the surface of the liquid therein. Under the operating conditions employed for a given crystallization, the feed solution will, by means of vaporization and release of superheat reach equilibrium with respect to the vapor in the crystallizer. The resultant concentration will produce crystallization and/or salting out.

This type of crystallization has found application in a number of installations and for a number of materials. One of the disadvantages, however, in this type of equipment is the salt build-up which occurs in the vapor section. During crystallizer operation, salt from the entrained liquor forms and gradually accumulates on salt shelves provided by irregularities in the surface of the vapor section and impedes the vapor flow in this section. This requires that the crystallizer be shut down periodically in order to carry out cleaning operations for removing the salt build-up.

In accordance with this invention, the problem of salt build-up is minimized by providing a crystallizer design having large capacity, which gives maximum ratio of vapor release area to volume, and smoothness in design, which eliminates irregularities of conventional designs. This is accomplished by employing a crystallizer vessel having a hemispherical top portion and a bottom portion directly connected thereto which has inwardly converging sides to provide in a preferred embodiment a conispherical configuration. There is thus provided a maximum cross-sectional area at the boiling surface which improves the crystallization process by providing a large vapor release area and reducing the amount of entrainment in vapors boiled off the liquor.

FIGURE 1 is an elevation view illustrative of the crystallization section of a multi-effect crystallization system wherein the process vessels of this invention are employed.

FIGURE 2 is a plan view of the crystallization system shown in FIGURE 1.

FIGURE 3 is a schematic flow diagram of a crystallization system for effecting the fractional crystallization of two different salts from a single solute.

FIGURE 4 is a cross-sectional view of a crystallizer vessel having an integral thickening section.

FIGURE 5 is a cross-sectional view taken along line 5—5 of FIGURE 4.

FIGURE 6 is a cross-sectional view of another embodiment of a crystallizer vessel having an integral thickener section which permits internal circulation and direct contact between the thickener section and the crystallizing section.

FIGURE 7 is a cross-sectional view taken along line 7—7 of FIGURE 6.

FIGURE 8 shows an enlarged fragmentary view of the equator belt illustrating the smooth interior surface that can be formed at the juncture between the hemispherical top portion and the bottom portion of the crystallizer vessel.

FIGURE 9 is an elevation view of a modified form of the crystallizer vessel falling within the scope of the invention.

FIGURE 10 is an elevation view of a further modification of the crystallizer vessel of the invention.

From the drawings it will be seen that the crystallizer vessel of this invention provides a bottom portion which permits the smooth and efficient removal of crystals and by employing a hemispherical top portion which is connected thereto, a maximum vapor liquid surface per unit of volume is provided.

In FIGURE 1 there is illustrated a crystallization section of a crystallization system employing crystallizer vessels 10 and 20 in a partial crystallization system. In addition to the illustrated crystallization there is employed in conjunction therewith (but not shown) auxiliary equipment which is used in the recovery of the crystals from the magma discharged from the crystallization section as will be discussed in the illustrative crystallization system shown in FIGURE 3. These vessels are large capacity units as illustrated by the size of the operator's figure F, standing adjacent the circulation equipment for crystallizer vessel 10. Crystallizer 10 comprises a vessel having a top portion 11 and a substantially conical bottom portion 12 joined directly together at the point of tangential intersection. A feed inlet 13 is employed to introduce the heated feed solution into the vessel from a suitable source not shown. Suitable operating conditions for effecting the equilibrium flash vaporization of the crystallization vessels 10 and 20 are provided by means of a conventional steam jet ejector 30 which is connected to the vapor outlet 21 of the second crystallizer 20. There is provided a circulation system comprising a solute outlet 14, a recirculation pump 15 and a conventional indirect heat exchange element 16 (with the flow of the heat transfer medium such as steam supplied from a suitable source shown by a conventional symbol). The recirculation system is interconnected by suitable piping which is used to recirculate the solute in order to insure that the incoming solution is brought to the surface of the solute at the interface of the vapor liquid area to permit the solution to flash to equilibrium with the vapor in the crystallizer, connects with the feed inlet and the admixed solute is introduced into the crystallization zone through feed inlet 17. Recirculation prevents short circuiting of the feed directly to the magma outlet 18 which is located at the bottom of the vessel.

Vapors from the vapor zone of crystallizer 10 are withdrawn through a catch-all type separator 19 and are used to supply heat to the heating element 22 included in the solute recirculation system of crystallizer 20.

The feed to crystallizer 20 is introduced through inlet 31 from a source which will hereinafter be discussed in the use of the illustrated crystallization section in the crystallization system shown in FIGURE 3. Crystallizer 20 has substantially the same general configuration of crystallizer 10 and comprises a hemispherical top portion 23 and a conical portion 24 joined thereto to form an equator belt. A similar recirculation system is provided for the recirculation of the solute comprising a solute outlet 25, a circulation pump 26 such as propeller type, heating element 22 and a solute inlet 27, all interconnected by suitable piping to feed inlet 31 to permit the recirculating flow of solute from outlet 25 to inlet 27. A magma outlet 28 is provided for removing the slurry of mother liquor and crystals from the crystallizer 20 after the desired crystallization has been effected. In order that the crystallization vessels can be positioned at a desired elevation, a self-supporting structure such as columns 30 and 31 or other structural arrangements are used for supporting crystallizers 10 and 20.

A crystallization system employing the crystallization section similar to that illustrated in FIGURES 1 and 2 is shown in FIGURE 3. The illustrated crystallization system is employed commercially for the fractional separation of sodium borate and sodium sulfate salts from a single solute. The crystallization system consists of a first effect crystallizer 40 and a second effect crystallizer 50. Crystallizers 40 and 50 have the same outer configuration as those previously discussed in FIGURES 1 and 2, with the exception that the interior of each vessel is provided with an integral thickening section formed by internal baffles 41 and 51 which provide inner compartments 42 and 52 integral with the crystallizer vessels 40 and 50. These compartments function as thickeners for further facilitating the removal of the mother liquor from the magma and improve crystal recovery. For simplicity, the drawing does not show various pumps, valves, bypasses and other auxiliaries, the proper placement of which will be evident to those skilled in the art.

Feed from a suitable source is introduced into the system by means of primary line 60 which branches to provide secondary feed lines 61 and 62. The saturated solute fed through line 61 discharges into an accumulator 63 which receives, via line 64, clear overflow from the thickener section 52 of crystallizer 50 and mother liquor via line 65 from centrifuge 66 into which is fed magma via line 67 which is removed from the thickener section 52 of crystallizer 50. The centrifuge separates the residual amounts of mother liquor from the wet crystals which are produced in crystallizer 50 and produces the final product through line 68. In the instant system wherein a solute containing sodium sulfate and sodium borate salts are processed, sodium borate is produced at this point. The other portion of the solute feed which passes through line 62 empties into accumulator 70. Similar to the operation of crystallizer 50, clear overflow from the thickener compartment 42 of crystallizer 40 is passed via line 71 to the accumulator 70. The magma from the thickener compartment 42 of crystallizer 40 is pumped through line 72 into centrifuge 73 wherein the mother liquor is separated from the wet crystals and discharged from the centrifuge through line 74 into accumulator 70. The finished crystals, which, in this instance, consist of sodium sulfate crystals, are discharged from the centrifuge through line 75. The feed to crystallizer 40 is pumped from the accumulator 63 and passed via line 76 to an inlet in the recirculation system located upstream of the heating element 77 which is an element in the recirculation system. This feed is admixed with magma discharged from an intermediate thickening section 78 of thickener 42. In this intermediate section 78 magma containing crystals of a smaller size than desired are accumulated for recirculation through crystallizer section via line 79. Solute from the crystallizer section of crystallizer 40 is discharged through line 80 whereby it admixes in line 81 with the feed from accumulator 63 and the magma from the intermediate section 78 of thickener 42. The feed admixture is then recirculated by means of pump 82 through heater 77 and introduced into the crystallizer section of crystallizer 40 by means of line 83. Heat exchanger 77, which is an indirect type, is steam heated by means of steam which is introduced through line 84. The condensate from this steam heating operation is removed through line 85 and returned to the steam boiler (not shown) for re-processing into steam. Magma containing crystals of desired size are discharged from the crystallization section of crystallizer 40 and transferred to the thickening section 42 through line 43.

The feed to crystallizer 50 is provided by means of the solute admixture produced in accumulator 70. The feed from accumulator 70 is transferred via line 90 to the recirculation system of crystallizer 50 upstream of the heater element 91. As in the operation of crystallizer 40, the feed to crystallizer 50 is made up of magma from the intermediate thickening section 92 of thickener 52 containing small size crystals which is transferred via line 93 and recirculating solute discharging from the crystallizer section of crystallizer 50 through line 94. These feed sources are admixed in line 95 of the recirculation system and pumped by means of pump 96 through heater element 91 and introduced into the crystallizer section of crystallizer 50 through line 97. Magma containing crystals of desired size is discharged from the crystallization section of crystallizer 50 and transferred to the thickening section 52 through line 53. In its operation, crystallizer 50 is operated at a lower temperature than crystallizer 40. Accordingly, the vapor removed from the vapor zone of crystallizer 40 through the catch-all separator 99 is used as the heat exchange medium for heat transfer in heater 91. The resultant condensate is then discharged from heater 91 through line 100. The desired operating conditions within crystallizers 40 and 50 are produced by means of steam jet ejector 101 into which is introduced through line 102 the vapor effluent from crystallizer 50. Condensate from ejector 101 is removed via line 103 for further processing.

As shown in FIGURE 3, the crystallizer of this invention can have incorporated in its design an integral thickening section which facilitates the separation of the mother liquor and crystals in the magma. In the operation of the crystallizer of this invention, crystallization can be effected in the crystallization section to produce a magma which can be treated to effect separtion of mother liquor from the wet crystals by a variety of operations. In the event a crystallizer such as is shown in FIGURE 1 is utilized which does not have an internal thickening section, it is necessary to employ a crystal recovery operation requiring the use of a filter press or combination of a thickener and a centrifuge in order to effect the recovery of the crystals from the magma. The crystallization and thickening operation, however, can be effected employing the crystallizers constructed in accordance with this invention shown in FIGURES 4 and 6, wherein crystallization is effected in one zone within the crystallizer and thickening in a second zone integral with the crystallizer vessel.

In FIGURE 4, the illustrative crystallizer 110 comprises a hemispherical top section 111 and a conical bottom section 112 joined directly thereto at the point of tangential intersection. The feed is introduced in this illustrative embodiment via line 113 through feed inlet 114 into the crystallization zone 115. Recirculation of the solute is provided by means of the recirculation system 116 which has been previously described. The crystal slurry is removed from the crystallization zone 115 via magma outlet 117 and passed through line 118 to the thickener zone 119 which is formed by means of an internal baffle 120 which is joined to the side walls of the bottom portion 112 of the crystallizer 110 to form an integral thickener compartment 119. The thickener operates in a conventional manner and permits the discharge of a clear overflow which decants to the top of the slurry and which is discharged through outlet 122. The thickened magma then settles to the bottom of compartment 119 and is discharged through outlet 123 for further processing to separate the mother liquor and wet crystals.

An alternative combination crystallizer-thickener is shown in FIGURE 6. In this instance, crystallizer 130, having a hemispherical top portion 131 and a conical bottom portion 132, is provided with an internal baffle 133 which is joined at its free ends to the side wall of conical bottom 132. The thickening zone 136 thus formed is not closed. The bottom 134 is left open to provide direct access to the crystallization zone in order to permit a natural circulation of the solute to be thickened into the thickener portion. The clear liquid overflow which decants in the thickener zone 136 is removed through overflow 137. In this instance, magma which is further processed to separate the mother liquor and wet crystals is discharged through magma outlet 138 for further processing in a filter or centrifuge system. A recirculation system 139 is also provided.

Generally, the thickening zone has an exposed surface area at the equator belt of about 5% to 50% of the total liquid level surface area at the equator belt. If desired, intermediate classification of the magma in the thickening zone can be effected employing intermediate baffles within the zone as discussed in the description of FIGURE 3. Although the baffle wall is shown as arcuate, a straight wall can also be employed.

In a crystallizer structure built in accordance with the instant invention, the region of the liquor surface is designated as the equator belt. In this region which is located adjacent the juncture of the hemispherical top portion and conical bottom portion, there are a number of key process functions, namely, release of superheat, vapor generation, supersaturation of salt in liquor, and mother liquor clarification. Further, the configuration provided by the crystallizer of this invention is significant in that the interior of the vessel is smooth and free from irregularities. The contour changes at this juncture are significant in that it is important to maintain flow. That is, the liquor containing crystals must be kept in motion for otherwise the crystals will settle and cause salt build-up and plugging. Hence, it is important to avoid irregularities in the interior of the vessel which can cause local static areas or projections which result in the formation of salt shelves upon which the salt can accumulate with attendant disadvantages. Once any such settling occurs, the salt shelves continue to grow, and mechanical means are required to clear the vessel. By means of the subject invention, the structural plates which are joined at this juncture are preferably butt welded and the welds ground smooth along with the rest of the interior in order to provide a smoothness of design and eliminate irregularities of conventional designs. An illustration of the smooth area in the equator belt is illustrated in FIGURE 8 which shows a fragmentary view of a portion of a hemispherical top portion 150 joined to a conical bottom portion 151 by means of a butt welded joint 152 which has been ground smooth along the interior surface 153 of the joint. The conispherical vessel having a smooth interior surface permits the liquor to flow downwardly without danger of the formation of salt shelves.

In introducing the feed solution into the crystallization zone of the crystallizers of this invention, it is preferred that the inlet be offset or non-radially oriented with respect to the crystallizer vessel. The preferred location of the inlets is shown, for example, in FIGURES 5 and 7 wherein the inlet is offset or non-radially directed into the interior of the vessel. With this location of the inlet there is a natural mixing action effected by the introduction of the feed solution which permits a substantially even distribution of the solution throughout the surface at the vapor-liquid interface which provides large surface area and permits the water to be removed in an optimum manner.

In the crystallizers, suitable clean-out nozzles 124 and 140 as shown in FIGURES 4 and 6 are provided at the base of the crystallization vessels to facilitate removal of sludge, salt falldown, or other accumulations.

As shown in certain of the figures, the magma outlet is located in the conical bottom portion intermediate the bottom-most clean-out nozzles and the solute outlet employed in the recirculation systems. It can be positioned depending upon the needs of the designer at any location between these outlets in the conical bottom or in the recirculation system.

According to the modification illustrated in FIGURE 9, there is shown crystallizer vessel 160 substantially identical in significant features to the crystallizer vessels shown in the other figures such as crystallizer 10 of FIGURE 1. In this modification, crystallizer 160 is provided with a magma outlet means 161 at the bottom of the vessel. In addition, crystallizer 160 is provided with an inverted conical partition 162 which is secured at its peripheral rim to the interior wall of the crystallizer at a point substantially below the inlet 163. An opening 164 is provided at the apex of partition 162 and is arranged co-axially with magma outlet means 161, the wall portion of the opening extending downwardly for a greater distance along one side to prevent short circuiting of the liquor as will be more apparent hereinbelow. Arranged below opening 164 but above magma outlet means 161 is an inverted U-shaped baffle member 166 desirably having substantially the same diameter as opening 164 and arranged co-axially with opening 164 and magma outlet means 161. The recirculation system for the solute is substantially as described with reference to FIGURE 1 wherein solute passes via line 168 through a conventional heat exchange element 170 and returns to the crystallizer at inlet 163. The outlet for line 168 is desirably adjacent opening 164 and preferably is provided with an extending wall portion 172 to prevent short circuiting of the liquor. Clear mother liquor is withdrawn through outlet 174 to the accumulator such as described above with reference to the other embodiments.

In operation, crystallizer 160 provides as an integral part of the vessel a separating and thickening zone. The mother liquor and crystals pass through opening 164. The magma which accumulates in the lower part of the vessel below member 166 is withdrawn through magma outlet means 161 and is passed to a centrifuge and settler such as described above. Short circuiting of the magma is prevented by means of the downward wall extension of opening 164 and the wall extension 172, and in this manner, solute is recirculated via line 168. The recirculation stream thus contains a very low percentage of crystals. Clear mother liquor is withdrawn from the crystallizer via line 174 at a point adjacent member 166.

A still further modification is shown in FIGURE 10. There is illustrated crystallizer vessel 180 having substantially the same significant features as the crystallizers illustrated in the previous drawings. Here the crystalizer is provided with an inlet means 182 adjacent the liquid level and a magma outlet means 184 at the apex of the vessel. A recirculating opening 186 is provided intermediate the inlet and magma outlet for recirculation solute substantially as described above. In addition, there is provided an after-settler indicated generally by the reference numeral 188. The after-settler comprises a substantially cylindrical section 190 joined at its top marginal edge to the exterior wall of the crystallizer above the magma outlet means 184 and surrounding the magma outlet means. Extending downwardly from the cylindrical section 190 is an inverted conical extension 192 having an outlet 194 at its apex and co-axially arranged with magma outlet means 184. The cylindrical section 190 is further provided with an outlet means 196 which is located desirably above magma outlet means 184. In addition, the wall of magma outlet means 184 adjacent the outlet 196 may be extended downwardly for a short distance to prevent short circuiting of the liquor.

In the operation of crystallizer 180, the liquor and crystals pass to the after-settler 188, and the magma accumulates in the bottom portion thereof and is passed through opening 194 to a centrifuge and settler as described above. The substantially clear mother liquor is withdrawn and may be recirculated to another crystallizer or to an accumulator. The after-settler is advantageous for it permits control of the circulating magma in the crystallizer in that the magma may be passed to the settler for concentrating and recovering and clear mother liquor may be recycled to another crystallizer. Where desired, the magma may be thickened in the after-settler and then passed directly to a common settler for a number of crystallizer vessels in a multi-effect system.

The instant invention has particular application in the design of crystallizer capacity of 50,000–2,000,000 gallons producing crystal yields of 50–2,000 tons per day, although it can be employed for crystallizers outside these ranges. It is especially adaptable for the crystallization of alkali metal borates and sulfates, chlorides, sugar and other crystallization systems conventionally processed in salting out evaporator crystallizers.

Although the foregoing invention has been described with reference to several illustrative embodiments, it is evident that modifications and variations can be made by those skilled in the art to which the instant invention pertains. The illustrated crystallizers use a conical bottom portion. As the crystalizer diameter increases, however, the junction of sphere and conical bottom can be made lower and the crystallizer approaches a spherical configuration. For example, a 60′ diameter crystallizer is almost a true sphere. For example, the crystallizers can be fitted with entrainment separators such as stainless steel mesh type entrainment separators for additional vapor polishing. In the construction of the crystallizers, conventional materials of construction can be used. Where corrosive conditions are encountered, corrosion resistant ferrous or non-ferrous alloys, clad steels and the like can be used. Although not shown, the process vessels, piping, etc., are lagged with adequate insulation to minimize heat loss. The instant invention has a substantial application in large capacity crystallizers which have diameters at the equator belt of about 12′ and above. In the illustrative embodiments shown in FIGURE 1, the first effect crystallizer had a diameter of 22′ at the equator belt while the second effect crystalizer had a diameter of 26′. Such vessels are field erected which is facilitated by the design of this invention.

What is claimed is:

1. A chemical processing crystallizer having large capacity comprising a conispherical vessel having a hemispherical top portion and a conical bottom portion directly connected to said top portion converging to an apex at the bottom of said vessel, the intersection of said top portion and said bottom portion being tangential, an equator belt in said top portion, a vapor outlet in said top portion, feed inlet means immediately adjacent and below said equator belt, a recirculating solute outlet in said bottom portion below said feed inlet means and connecting with said feed inlet means, and a magma outlet means in said bottom portion.

2. A chemical processing crystallizer having a large capacity comprising a conispherical vessel having a hemispherical top portion and a conical bottom portion directly connected to said top portion converging to an apex at the bottom of said vessel, the intersection of said top portion and said bottom portion being tangential, an equator belt in said top portion, a vapor outlet in said top portion, feed inlet means immediately adjacent and below said equator belt, a recirculating solute outlet in said bottom portion below said feed inlet means and connecting with said feed inlet means, a magma outlet means in said bottom portion, a crystallization zone and separate thickener zone integral with said vessel.

3. A chemical processing crystallizer having a large capacity comprising a conispherical vessel having a hemispherical top portion and a conical bottom portion directly connected to said top portion converging to an apex at the bottom of said vessel, the intersection of said top portion and said bottom portion being tangential, an equator belt in said top portion, a vapor outlet in said top portion, a crystallization zone and a separate thickener zone integral with said vessel provided by an internal baffle wall extending downwardly from said equator belt and having its marginal edges below said equator belt connected to the wall area of said bottom portion, a liquid overflow means in said vessel communicating with the interior of said thickener zone adjacent said equator belt, a feed inlet means immediately adjacent and below said equator belt communicating with said crystallization zone, a recirculating solute outlet in said bottom portion below said feed inlet means and connecting with said feed inlet means, a first magma outlet means in said bottom portion communicating with said crystallization zone, a magma inlet in said thickener zone and a second magma outlet means in said thickener zone.

4. A chemical processing crystallizer having a large capacity comprising a conispherical vessel having a hemispherical top portion and a conical bottom portion directly connected to said top portion converging to an apex at the bottom of said vessel, the intersection of said top portion and said bottom portion being tangential, an equator belt in said top portion, a vapor outlet in said top portion, a crystallization zone and a separate thickener zone integral with said vessel in said bottom portion provided by a baffle wall depending downwardly from said equator belt and joined to the side wall area of said bottom portion, said baffle wall being provided with an opening permitting fluid communication between said crystallization zone and said thickener zone, a feed inlet means immediately adjacent and below said equator belt in communication with said crystallization zone, a recirculating solute outlet in said bottom portion below said feed inlet means and connecting with said feed inlet means, a magma outlet means in said bottom portion, and a liquid overflow means in said vessel communicating with the interior of said thickener zone adjacent said equator belt.

5. A chemical processing crystallizer having a large capacity comprising a conispherical vessel having a hemispherical top portion and a conical bottom portion directly connected to said top portion converging to an apex at the bottom of said vessel, the intersection of said top portion and said bottom portion being tangential, an equator belt in said top portion, a vapor outlet in said top portion, feed inlet means immediately adjacent and below said equator belt, a magma outlet means positioned at said apex of said bottom portion, an inverted conical partition arranged in said bottom portion having its peripheral rim secured to the interior wall of said vessel at a point substantially below said feed inlet means, an opening at the apex of said partition arranged co-axially with said magma outlet means, a recirculating solute outlet in said bottom portion below said partition and connecting with said feed inlet means, and a second outlet located below said recirculating solute outlet but above said magma outlet means.

6. A crystallizer in accordance with claim 1 in which said magma outlet is positioned intermediate said apex and said solute outlet.

7. A crystallizer in accordance with claim 1 in which said feed inlet means is offset from radial alignment.

8. A crystallizer in accordance with claim 1 in which said magma outlet means is positioned at the apex of said bottom portion.

9. A crystallizer in accordance with claim 1 in which said magma outlet means is positioned at the apex of said bottom portion, an after-settler comprising a cylindrical section connected to the exterior wall of said bottom portion and an inverted conical extension, said magma outlet means opening to said after-settler, an outlet means at the apex of said after-settler, and a second outlet means at the cylindrical section of said after-settler.

10. A crystallizer in accordance with claim 3 in which the thickener zone has an exposed surface area at the equator belt of about 5% to 50% of the total liquid level surface area of the equator belt.

11. A crystallizer in accordance with claim 5 including a directional baffle member positioned below said opening but above said magma outlet means.

References Cited by the Examiner

UNITED STATES PATENTS

| | | | |
|---|---|---|---|
| 807,767 | 12/1905 | Ordway | 159—45 X |
| 1,004,913 | 10/1911 | Salmini | 210—247 |
| 1,006,823 | 10/1911 | Block | 159—45 X |
| 1,036,127 | 8/1912 | Lillie. | |
| 1,191,108 | 7/1916 | Kestner | 159—27 X |
| 1,331,373 | 2/1920 | Prache | 159—45 |
| 1,630,037 | 5/1927 | Stresau. | |
| 1,860,118 | 5/1932 | Rau et al. | 159—31 |
| 2,047,306 | 7/1936 | Brookins et al. | |
| 2,066,577 | 1/1937 | Ritchie et al. | 23—273 |
| 2,261,486 | 11/1941 | Phillips | 159—22 |
| 2,567,959 | 9/1951 | Munday | 23—273 |
| 2,567,968 | 9/1951 | Saeman | 159—45 |
| 2,631,926 | 3/1953 | Eckstrom | 23—273 |
| 2,808,103 | 10/1956 | Cook | 159—45 |
| 3,112,239 | 11/1963 | Andermatt | 159—4 |

FOREIGN PATENTS

| | | |
|---|---|---|
| 3,899 | 7/1924 | France. |
| 15,288 | 9/1881 | Germany. |
| 757,757 | 9/1956 | Great Britain. |

NORMAN YUDKOFF, *Primary Examiner.*

G. P. HINES, *Assistant Examiner.*